DEFENSIVE PUBLICATION

UNITED STATES PATENT AND TRADEMARK OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent and Trademark Office makes no assertion as to the novelty of the disclosed subject matter.

PUBLISHED FEBRUARY 3, 1976

943 O.G. 74

T943,003

ATMOSPHERIC AMBIENT AIR TEMPERATURE MONITORING SYSTEM AND PROBE THEREFOR

Victor J. Schorn, Rte. 5, Box 323–B, Florence Ala. 35630, and Billie E. Brackeen, Rte. 4, Box 47, Tuscumbia, Ala. 35674

Filed July 25, 1974, Ser. No. 491,791
Int. Cl. G01k *1/08, 7/24, 13/02*
U.S. Cl. 73—362 AR
7 Sheets Drawings. 10 Pages of Specification

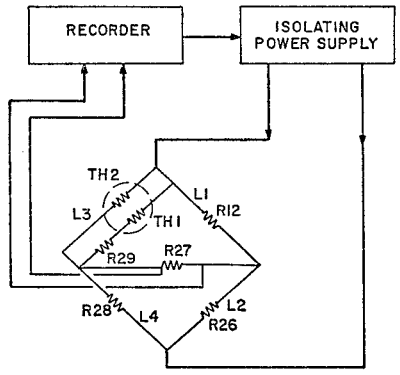

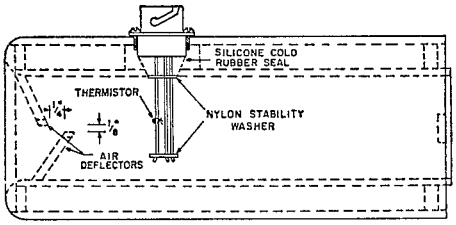

Figure 1:
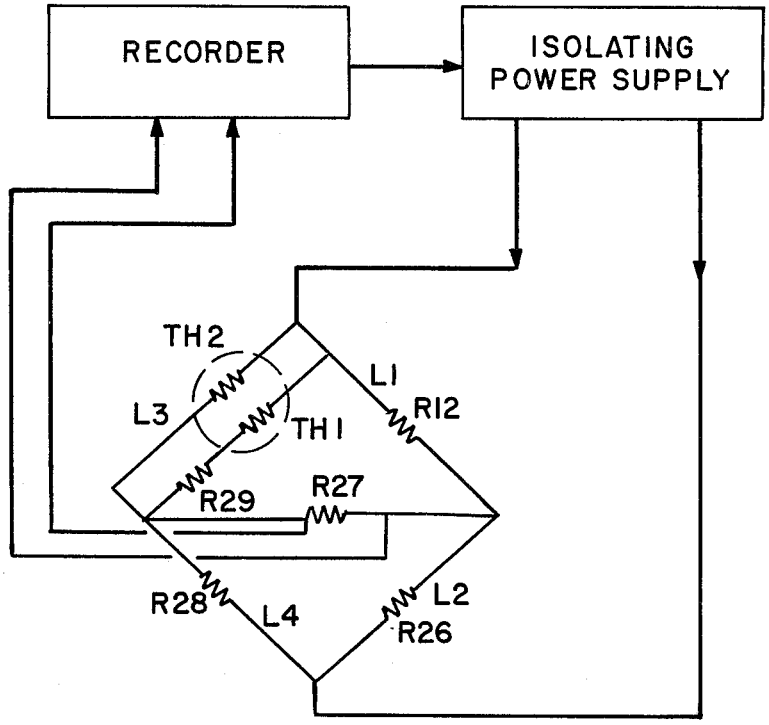
Figure 2:
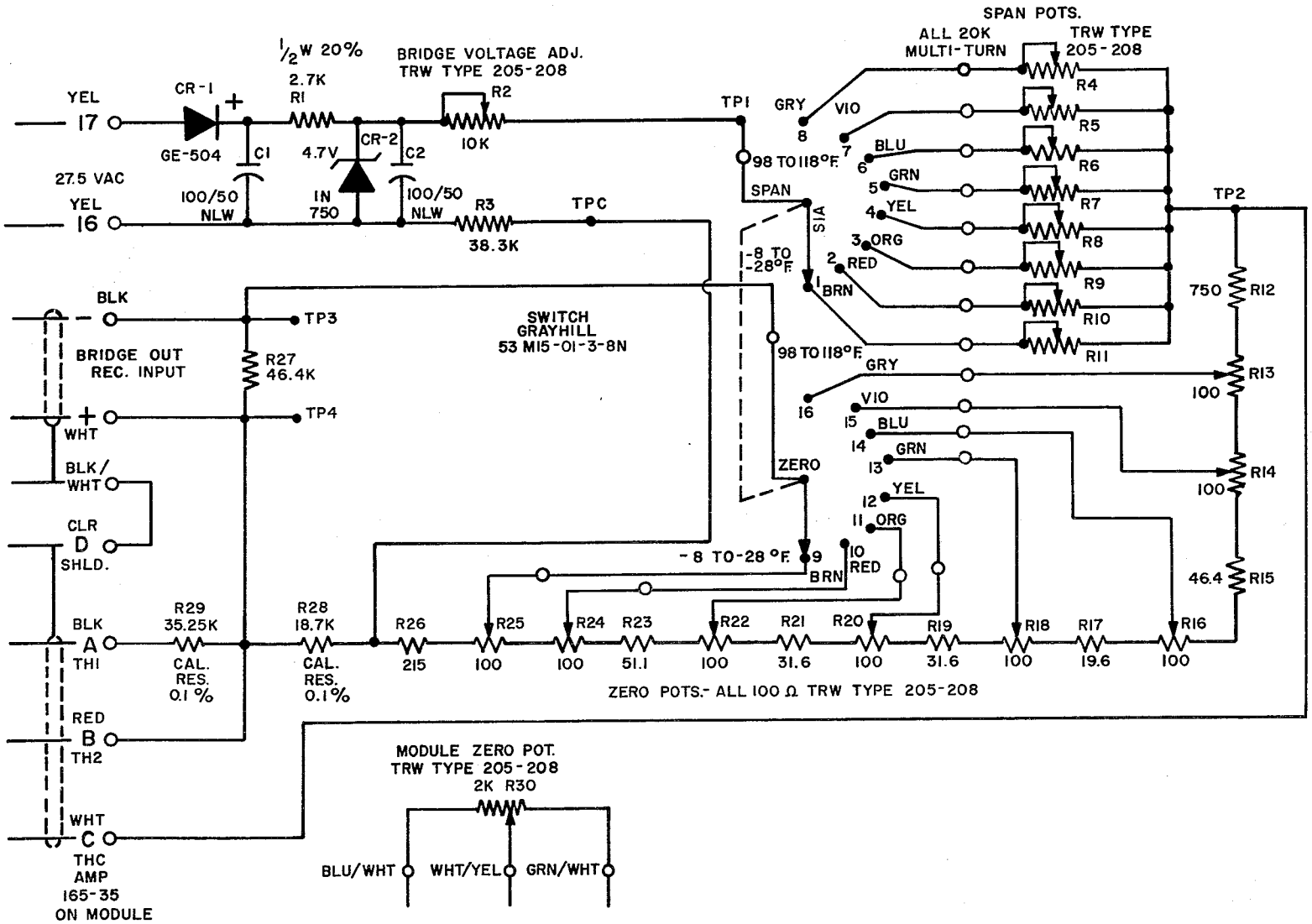
Figure 3:
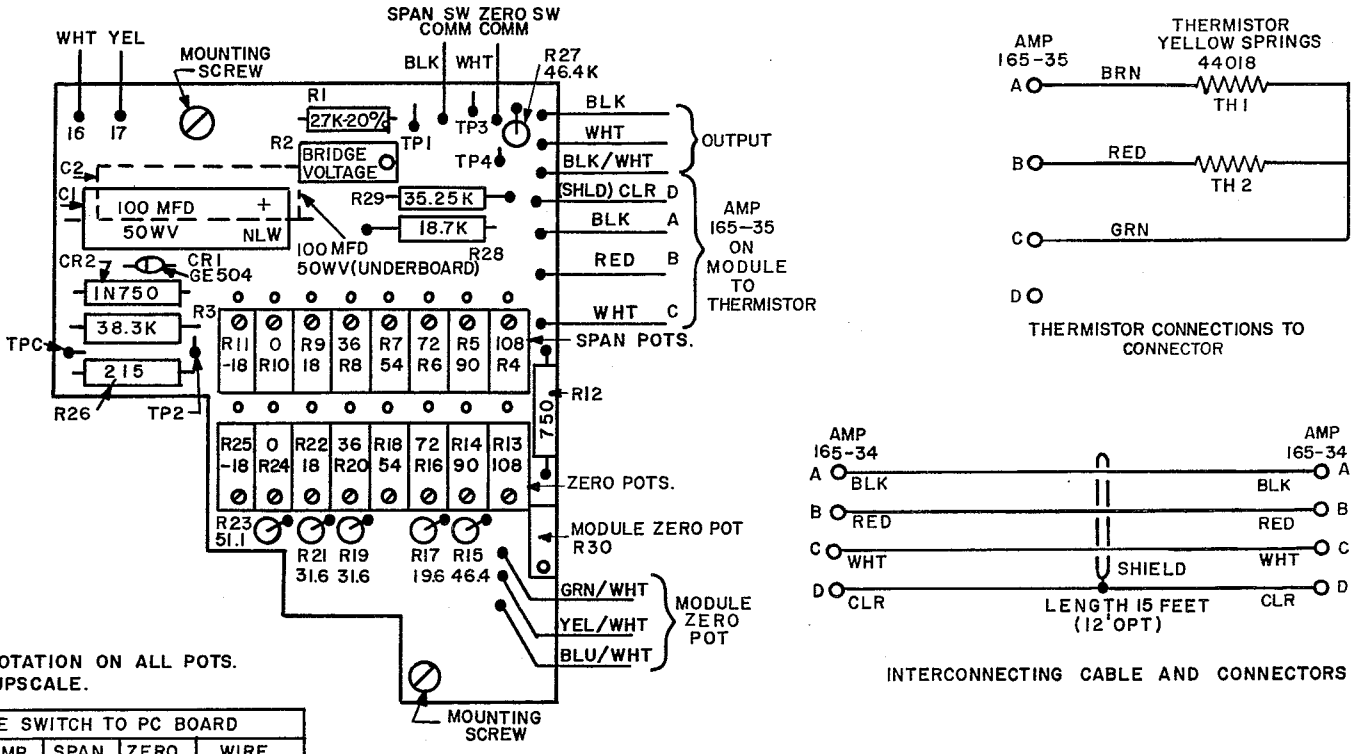
Figure 4:
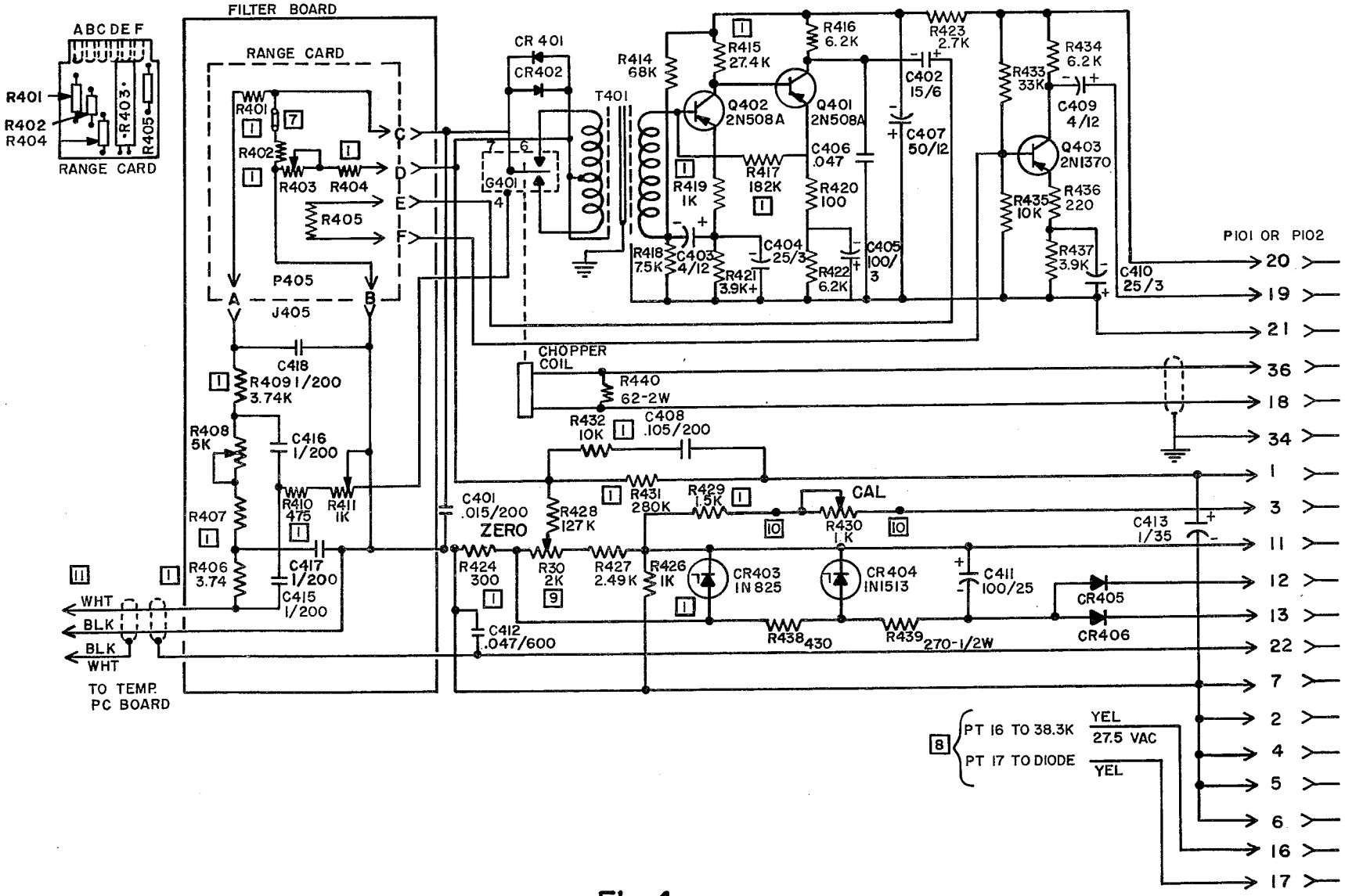
Figure 6:
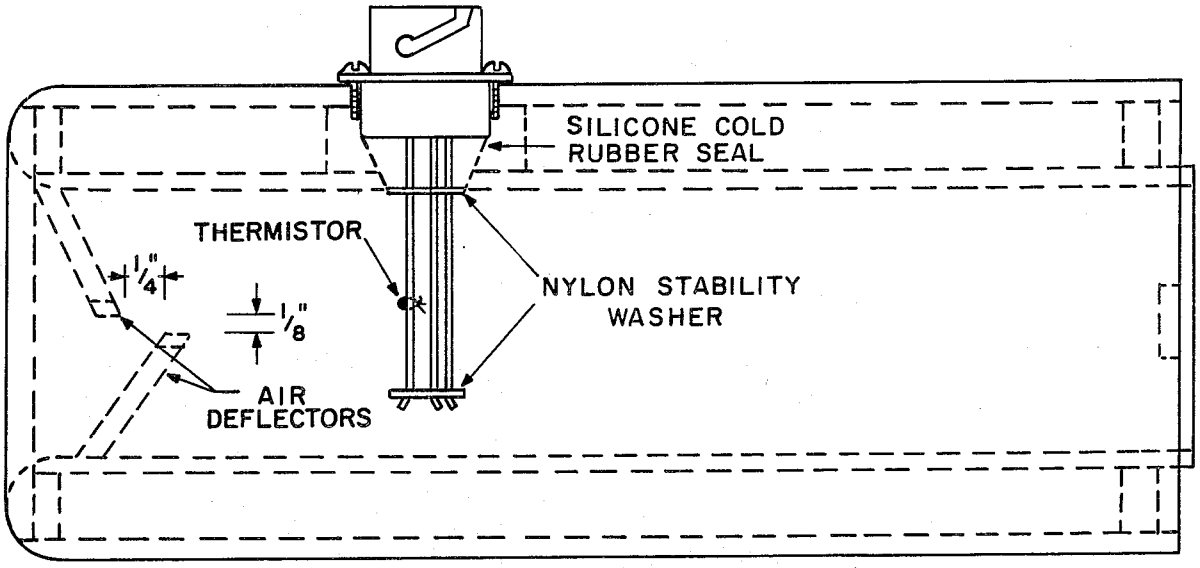

An aircraft-mounted air temperature measuring system (FIG. 1) having an effective linear temperature/resistance response of about ±0.15° C. over its full span of about −30° F. to about 120° F., comprising a probe housing for a dual element thermistor, said thermistor being a part of one of four legs of an electrical bridge in combination with readout means, power supply means, and a load resistor connected against two junctions of said bridge to provide voltage reading for said readout means. The bridge circuit is provided with switching for 8 ranges and is easily calibrated. Improved readout accurracy and resolution is obtained by using a readout device having a full-scale range that is only a portion of the total range of the thermistor-bridge combination. The use of multiple resistor in two legs of the bridge permits a switch, inserted between one end of the load resistor and a junction of two legs of said bridge, to change the location of the effective junction between said two legs. Variable resistors in these said two legs permit vernier adjustment of this location. Design of the probe housing (FIG. 6) minimizes interference from radiant heat energy, thereby enabling the thermistor sensor to respond only to the heat energy contained in the air flowing thereover.

NOTE:
CLOCKWISE ROTATION ON ALL POTS.
MOVES PEN UPSCALE.

| RANGE SWITCH TO PC BOARD | | | | |
|---|---|---|---|---|
| SWITCH POSITION | TEMP. RANGE | SPAN TERM | ZERO TERM | WIRE COLOR |
| 1 | -18 | 1 | 9 | BROWN |
| 2 | 0 | 2 | 10 | RED |
| 3 | 18 | 3 | 11 | ORANGE |
| 4 | 36 | 4 | 12 | YELLOW |
| 5 | 54 | 5 | 13 | GREEN |
| 6 | 72 | 6 | 14 | BLUE |
| 7 | 90 | 7 | 15 | VIOLET |
| 8 | 108 | 8 | 16 | GRAY |

TO TEST HP-YSI MARK 5 MODULES (RANGE TEMP. BRIDGE) SET UP AND CALIBRATION.

PRODUCTION MODULES

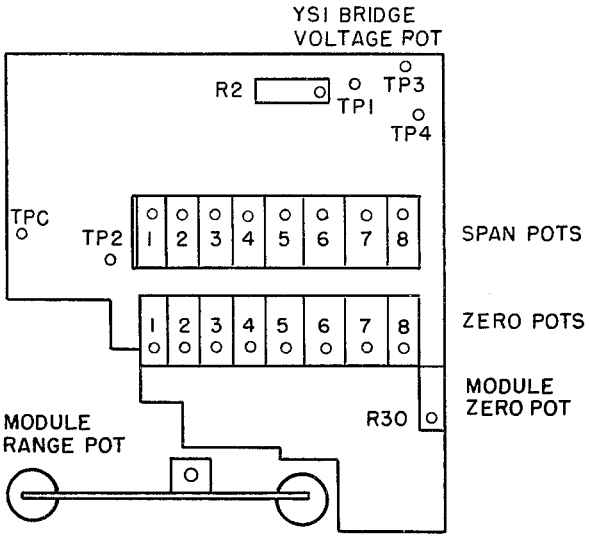

| RANGE | °F |
|---|---|
| 1 | -18 |
| 2 | 0 |
| 3 | +18 |
| 4 | 36 |
| 5 | 54 |
| 6 | 72 |
| 7 | 90 |
| 8 | 108 |

1. TO SET ZERO ON MODULE-
   CONNECT MODULE TO RECORDER AND PLACE JUMPER BETWEEN TP3 AND TP4 AND SET MODULE ZERO POT FOR ZERO ON RECORDER.

2. TO SET RANGE OF MODULE-
   WITH RESISTANCES SET ON DECADE BOXES TO GIVE 10MV READING BETWEEN TP3 AND TP4, USING FLUKE VOLTMETER, ADJUST RANGE POT ON MODULE RANGE CARD FOR FULL SCALE.

3. REPEAT 1 AND 2 ABOVE UNTIL ZERO AND SPAN IS SET.

4. TO SET BRIDGE POT-
   TURN ADJUSTMENT FULLY CW. TURN POT 5 TURNS CCW AND THIS SHOULD BE STARTING POINT. IF ALL SPANS CAN BE CALIBRATED, NO FURTHER ADJUSTMENT IS NECESSARY. IF ANY RANGE DOES NOT SPAN CORRECTLY THIS CONTROL SHOULD BE ADJUSTED TO PROVIDE MORE OR LESS D.C. VOLTAGE AS NEEDED TO THE BRIDGE.

5. SPAN AND ZERO POTS ARE IN LOCATIONS SHOWN ABOVE. SET IN TEST RESISTANCES ON DECADE BOXES AND CALIBRATE.

Fig. 5

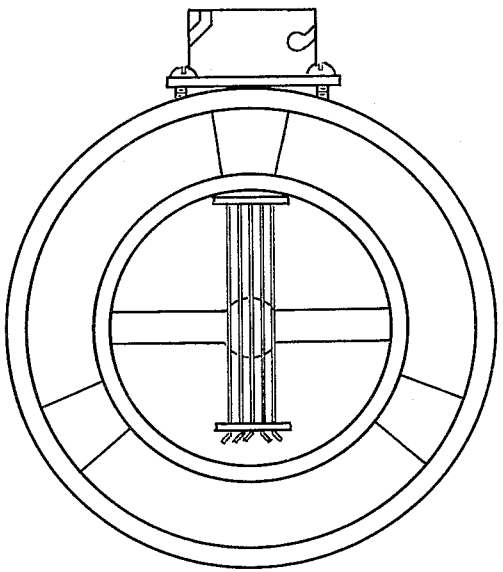
REAR VIEW
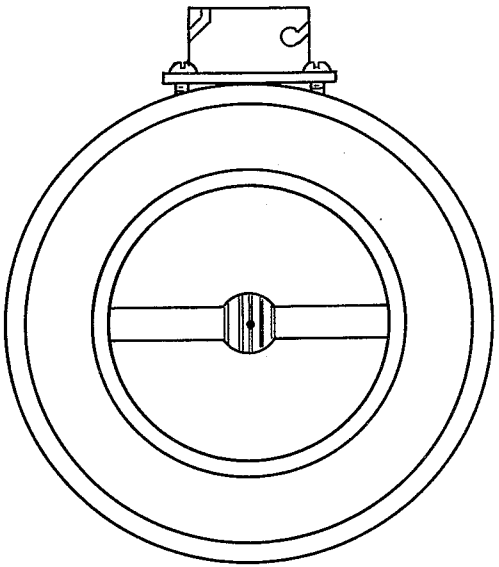
FRONT VIEW
Fig. 7